US009489210B2

(12) United States Patent
Eide et al.

(10) Patent No.: US 9,489,210 B2
(45) Date of Patent: Nov. 8, 2016

(54) IMPLEMENTING CONFIGURATION PRESERVING RELOCATION OF SRIOV ADAPTER

(71) Applicant: International Business Machines Corporation, Armonk, NY (US)

(72) Inventors: Curtis S. Eide, Rochester, MN (US); Charles S. Graham, Rochester, MN (US); Mark G. Manges, Rochester, MN (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 13/788,279

(22) Filed: Mar. 7, 2013

(65) Prior Publication Data

US 2014/0258570 A1 Sep. 11, 2014

(51) Int. Cl.
*G06F 13/00* (2006.01)
*G06F 9/44* (2006.01)
*G06F 9/455* (2006.01)

(52) U.S. Cl.
CPC ......... *G06F 9/4411* (2013.01); *G06F 9/45558* (2013.01); *G06F 2009/45579* (2013.01)

(58) Field of Classification Search
USPC .......................................... 710/104, 10, 301
See application file for complete search history.

(56) References Cited

U.S. PATENT DOCUMENTS 5,253,344 A * 10/1993 Bostick ................ G06F 15/177 710/8
6,208,345 B1 * 3/2001 Sheard ..................... G06F 8/34 709/201
6,243,774 B1 * 6/2001 Eide et al. .................... 710/302
6,704,737 B1 * 3/2004 Nixon ............... G05B 19/4145 707/656
7,233,975 B1 * 6/2007 Gerraty .................. H04L 45/02 707/999.008
7,376,719 B1 * 5/2008 Shafer .................. H04L 41/082 709/203
7,743,189 B2 * 6/2010 Brown et al. ................ 710/104
8,301,806 B2 10/2012 Brownlow et al.
2002/0053044 A1 * 5/2002 Gold .................. G06F 11/1417 714/6.24
2003/0177344 A1 * 9/2003 Harvey, IV ......... H04L 41/0809 713/1
2006/0083217 A1 * 4/2006 Bae .................... H04L 41/0803 370/351
2008/0147904 A1 * 6/2008 Freimuth et al. ............... 710/22
2009/0133016 A1 * 5/2009 Brown et al. ..................... 718/1
2009/0177878 A1 * 7/2009 Gao et al. ..................... 713/100
2010/0169507 A1 * 7/2010 Sahita et al. .................. 709/250
2011/0078299 A1 * 3/2011 Nagapudi et al. ............ 709/223
2011/0078337 A1 3/2011 Jung et al.
2012/0102490 A1 4/2012 Eide et al.
2012/0131157 A1 * 5/2012 Gospodarek et al. ........ 709/222

(Continued)

OTHER PUBLICATIONS

"Solarflare 10G Ethernet Server Adapters Deliver Unified Single-Root I/O Virtualization (SR-10V) for Redhat Linus KVM", Solution Brief, Unified SR-IOV for Redhat Linux KVM, sales@solarflare.com, SF-105895-CD Issue 3, KVM-SR-10V-TB-052311, 2011 Solarflare Communications, Inc.

*Primary Examiner* — Paul R Myers
(74) *Attorney, Agent, or Firm* — Joan Pennington

(57) ABSTRACT

A method, system and computer program product are provided for implementing configuration preserving relocation of a Single Root Input/Output Virtualization (SRIOV) adapter in a computer system. At system power on an SRIOV adapter having been relocated to a different slot while the system was powered off is automatically detected, and the configuration data associated with the adapter automatically updated so that it remains associated with the adapter in the adapter's new location.

19 Claims, 8 Drawing Sheets

(56) References Cited

U.S. PATENT DOCUMENTS

2012/0150816 A1* 6/2012 Pafumi et al. ................ 707/679
2012/0167085 A1 6/2012 Subramaniyan et al.
2012/0179932 A1* 7/2012 Armstrong et al. ......... 714/4.11
2012/0191884 A1 7/2012 Brownlow et al.
2012/0215941 A1 8/2012 Brownlow et al.
2012/0218990 A1* 8/2012 Subramanyan et al. ...... 370/357
2012/0297379 A1 11/2012 Anderson et al.
2012/0311222 A1* 12/2012 Bowles et al. ................ 710/315

* cited by examiner

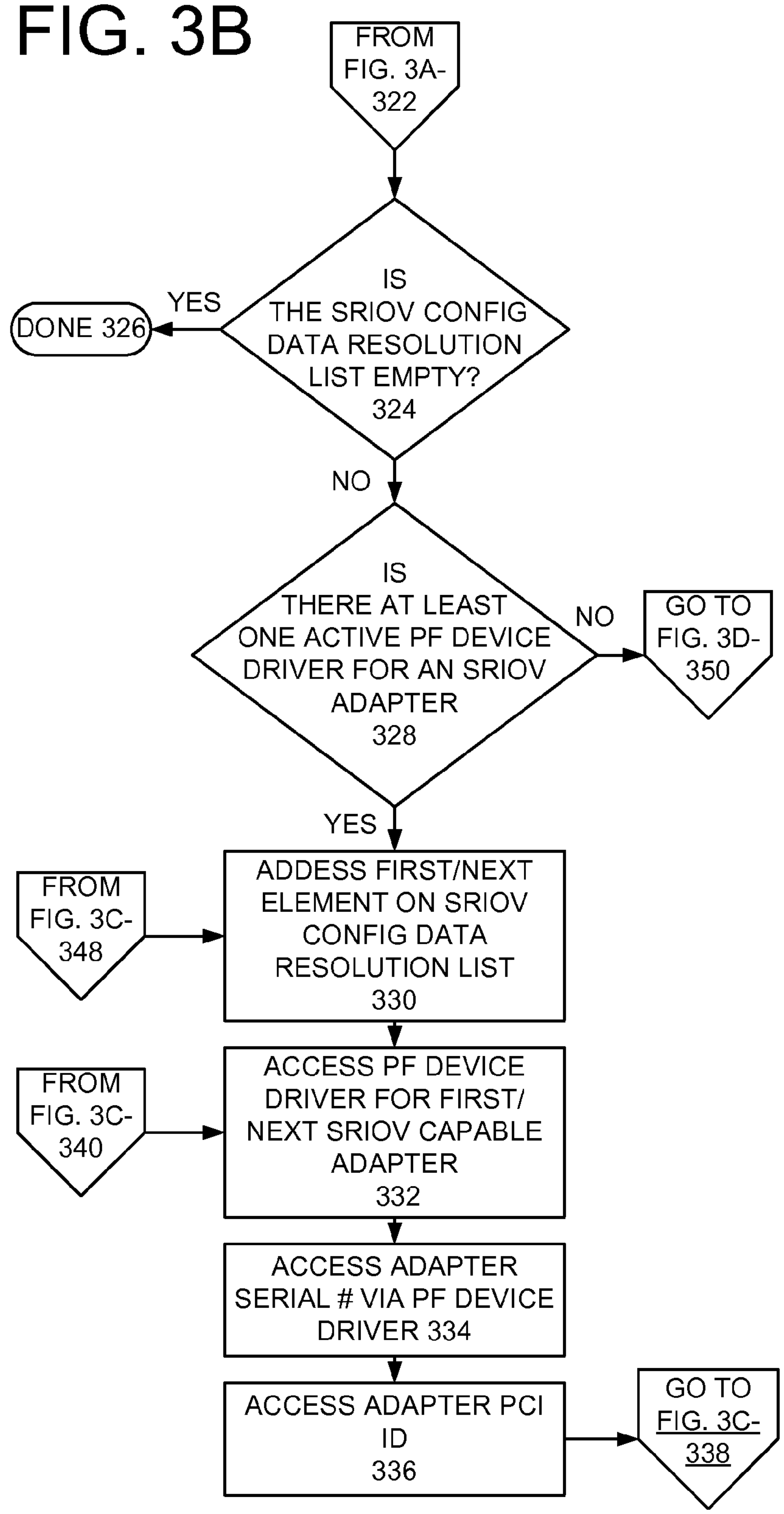
FIG. 3B
FROM FIG. 3A- 322
IS THE SRIOV CONFIG DATA RESOLUTION LIST EMPTY? 324
YES
DONE 326
NO
IS THERE AT LEAST ONE ACTIVE PF DEVICE DRIVER FOR AN SRIOV ADAPTER 328
NO
GO TO FIG. 3D- 350
YES
FROM FIG. 3C- 348
ADDESS FIRST/NEXT ELEMENT ON SRIOV CONFIG DATA RESOLUTION LIST 330
FROM FIG. 3C- 340
ACCESS PF DEVICE DRIVER FOR FIRST/ NEXT SRIOV CAPABLE ADAPTER 332
ACCESS ADAPTER SERIAL # VIA PF DEVICE DRIVER 334
ACCESS ADAPTER PCI ID 336
GO TO FIG. 3C- 338

IMPLEMENTING CONFIGURATION PRESERVING RELOCATION OF SRIOV ADAPTER

FIELD OF THE INVENTION

The present invention relates generally to the data processing field, and more particularly, relates to a method, system and computer program product for implementing configuration preserving relocation of a Single Root Input/Output Virtualization (SRIOV) adapter.

DESCRIPTION OF THE RELATED ART

SRIOV (Single Root Input/Output Virtualization) is an I/O adapter virtualization architecture that allows a single I/O adapter to be shared among multiple logical partitions. The adapter is presented as one or more physical functions (PFs) that control functions such as adapter level reset and offload engines that span the entire adapter, and a set of virtual functions (VFs) each of which represents a slice of the adapter capacity that can be assigned to a logical partition independently of other VFs.

There can be a large number of VFs configured for a particular adapter, in addition to adapter level configuration such as physical port attributes. The configuration associated with a given SRIOV adapter (i.e. VFs including logical port attributes and VF to logical partition assignment, physical port attributes, and the like) can be large and complex representing a significant effort on the part of the system administrator, and can evolve over time as workload demands increase.

There are times when it is beneficial or necessary to move adapters to different slots in the system. For example, IBM Power Systems allow a user to add capacity by adding additional I/O expansion units, GX++ adapters, and/or processor books/drawers. When additional capacity is added, overall system performance may be improved by relocating existing adapters so as to spread existing adapters evenly over the existing and new capacity.

Thus, there is a need to be able to move an SRIOV adapter to a different slot and preserve the configuration associated with it, ideally without user intervention. This is in contrast to requiring the administrator to delete or remove the configuration associated with the source slot, and then recreate it for the destination slot.

A need exists for an effective mechanism to enable configuration preserving relocation of a Single Root Input/Output Virtualization (SRIOV) adapter.

SUMMARY OF THE INVENTION

Principal aspects of the present invention are to provide a method, system and computer program product for implementing configuration preserving relocation of Single Root Input/Output Virtualization (SRIOV) adapter. Other important aspects of the present invention are to provide such method, system and computer program product substantially without negative effects and that overcome many of the disadvantages of prior art arrangements.

In brief, a method, system and computer program product are provided for implementing configuration preserving relocation of a Single Root Input/Output Virtualization (SRIOV) adapter in a computer system. At system power on time, an SRIOV adapter having been relocated to a different slot while the system was powered off is automatically detected, and the configuration data associated with the adapter automatically updated so that it remains associated with the adapter in the adapter's new slot location.

In accordance with features of the invention, the SRIOV adapter having been relocated to a different slot also is identified at slot power on time.

In accordance with features of the invention, the configuration data includes an identifier of the slot in which the associated SRIOV adapter resides, a serial number of the associated SRIOV adapter in the slot, and a peripheral component interface (PCI) ID of the associated SRIOV adapter in the slot.

In accordance with features of the invention, a system hypervisor at system power on time automatically detects that an SRIOV adapter was relocated to a different slot includes identifying all instances of SRIOV configuration data where the data is associated with a slot in which there is no adapter, or the PCI ID stored in the configuration data does not match the PCI ID of the adapter in the slot with which the configuration data is associated, or the serial number stored in the configuration data does not match the serial number of the adapter in the slot with which the configuration data is associated.

In accordance with features of the invention, for each instance of SRIOV configuration data identified where an SRIOV adapter was automatically detected as being relocated to a different slot, all SRIOV capable adapters in the system are inspected looking for one with PCI ID and serial number that match the PCI ID and serial number in the configuration data.

In accordance with features of the invention, for each instance of SRIOV configuration data identified where the PCI ID and serial number match the PCI ID and serial number of an SRIOV capable adapter in a slot that is different than the one with which the configuration data is associated, the slot identifier is set in the configuration data to the identifier of the slot in which the associated adapter now resides and the configuration data is disassociated from original slot and associated with new slot.

In accordance with features of the invention, the system hypervisor manages the physical functions (PFs) associated with the SRIOV adapter. There are one or more PF device drivers per SRIOV adapter that manages the PFs for the adapter. The PF device drivers extend the capability of the hypervisor by providing device driver like capabilities for the PFs associated with a particular flavor of SRIOV adapter. The primary PF device driver must be started in order to read the adapter serial number.

In accordance with features of the invention, the SRIOV configuration data is stored in persistent data. The SRIOV configuration data is read from persistent data and placed in main memory with an initial program load (IPL) of the hypervisor. During runtime, the hypervisor keeps the cached and persisted copies current.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3A, 3B, 3C, 3D, and 3E together provide a flow chart illustrating exemplary operations for configuration preserving relocation of the SRIOV adapter in accordance with the preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing configuration preserving relocation of a Single Root Input/Output Virtualization (SRIOV) adapter in a computer system. At system power on time, an SRIOV adapter having been relocated to a different slot while the system was powered off is automatically detected, and the configuration data associated with the adapter is automatically updated so that it remains associated with the adapter in the adapter's new slot location.

Figure 1:
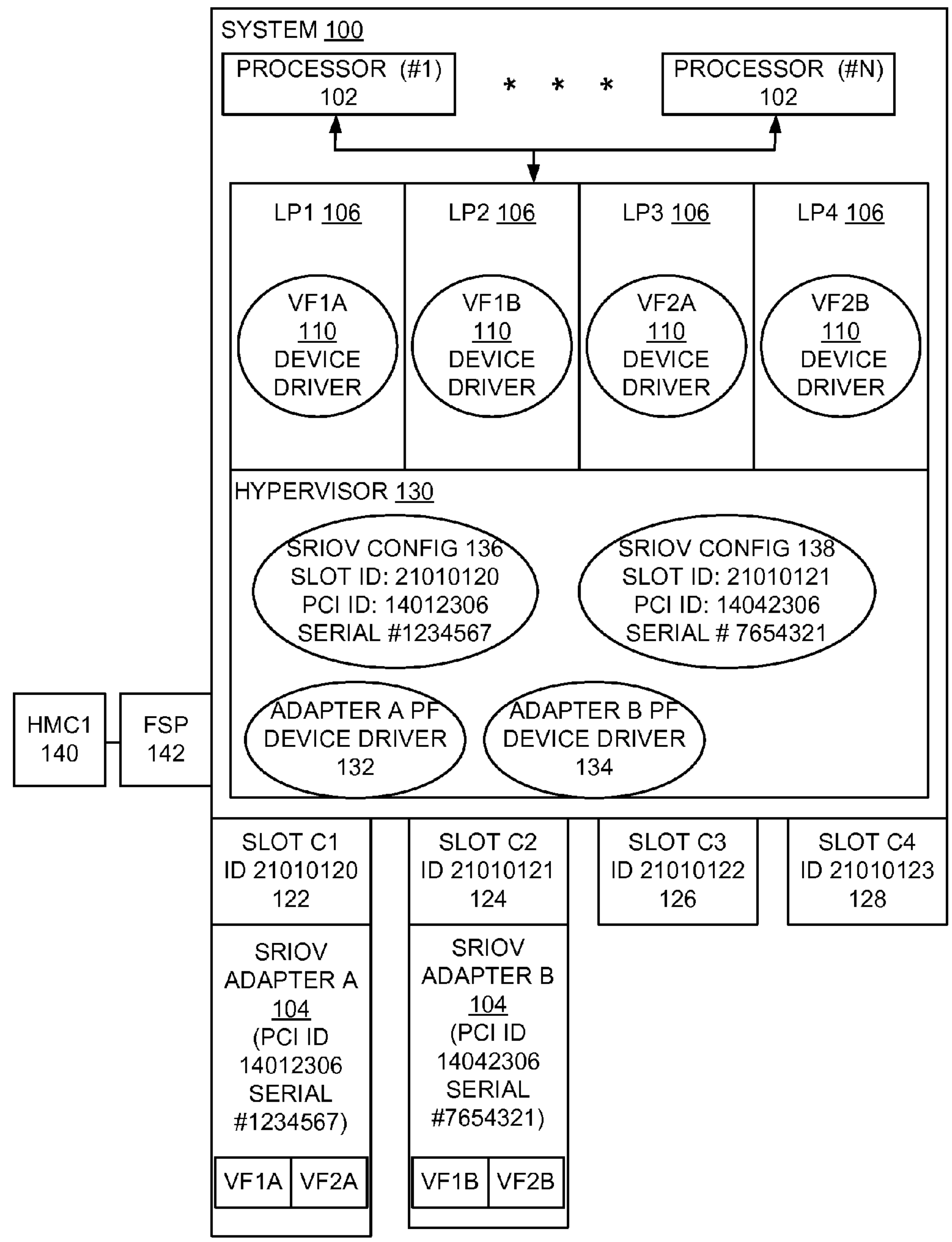
FIGS. 1, and 2 illustrates an example computer system for implementing configuration preserving relocation of a Single Root Input/Output Virtualization (SRIOV) adapter in accordance with the preferred embodiment.
Figure 2:
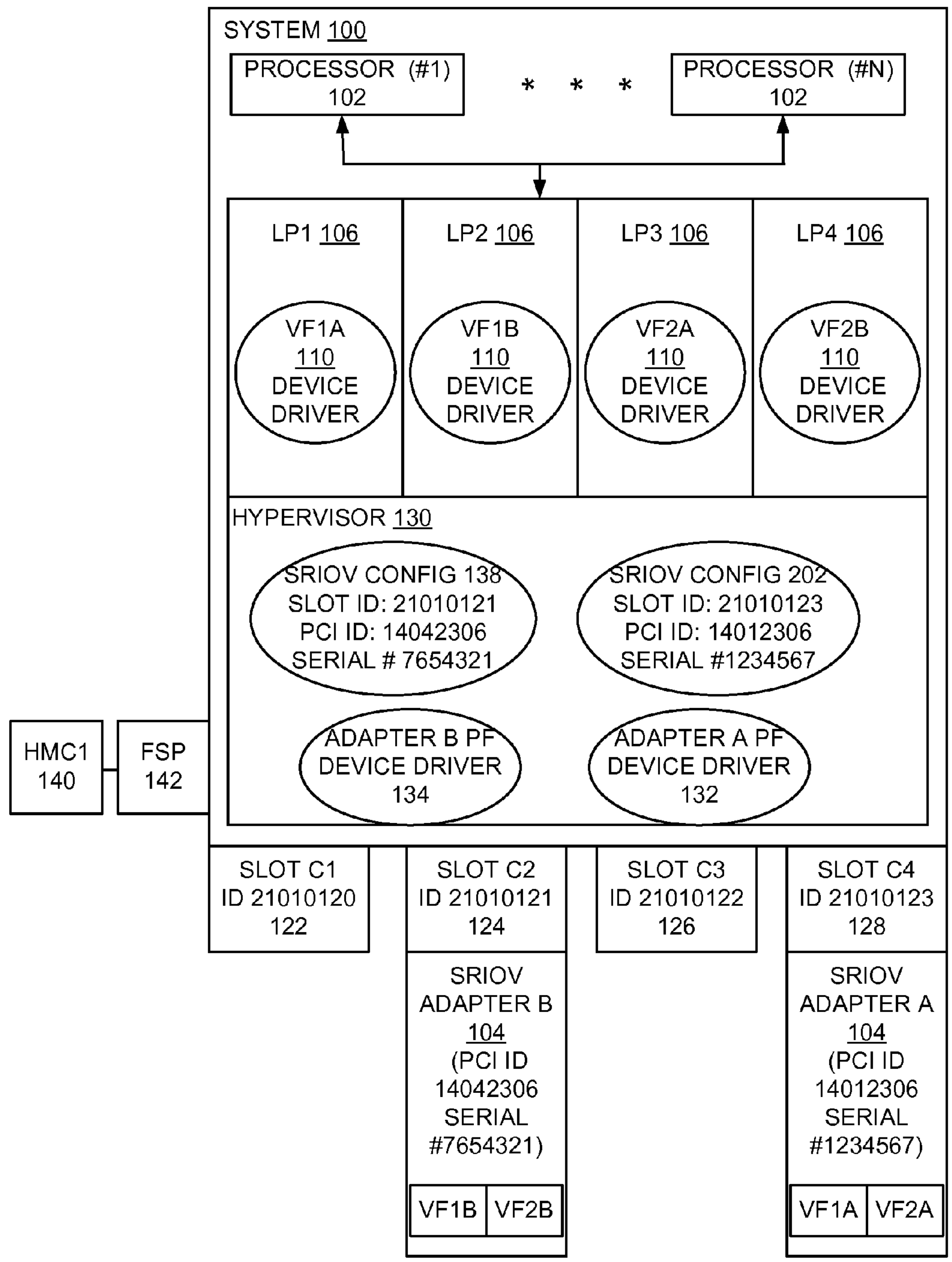

Having reference now to the drawings, in FIGS. 1 and 2, there is shown an example computer system generally designated by the reference character 100 for implementing configuration preserving relocation of a Single Root Input/Output Virtualization (SRIOV) adapter in accordance with the preferred embodiment. Computer system 100 includes a plurality of processors 102, #1-N or central processor units (CPUs) 102, #1-N together with a pair of Single Root Input/Output Virtualization (SRIOV) adapters A, 104, and B, 104, and a plurality of four logical partitions LP1 through LP4, 106.

As shown, each logical partitions LP1 through LP4, 106 owns a virtual function (VF) device driver, respectively shown as VF1A, 110, device driver, VF1B, 110, device driver, VF2A, 110, device driver, and VF2B, 110 device driver; each of which represents a slice of the adapter capacity that can be assigned to a logical partition independently of other VFs.

Computer system 100 includes a plurality of slots C1, 122, C2, 124, C3, 126, and C4, 128. Each of the slots C1, 122, C2, 124, C3, 126, and C4, 128 includes a respective slot ID, shown as ID 21010120; ID 21010121; ID 21010122; and ID 21010123.

Computer system 100 includes a hypervisor 130. As shown in the hypervisor 130 are adapter A, PF device driver 132, and adapter B, PF device driver 134 and SRIOV configuration data 136, 138 for each of the SRIOV shared mode adapters A, 104, and B, 104. The SRIOV configuration data 136, 138 includes an identifier of the slot in which the associated SRIOV adapter resides, a PCI ID of the associated SRIOV adapter in the slot, and a serial number of the associated SRIOV adapter in the slot, with example values shown. It should be understood that the PCI ID and serial number together are used to uniquely identify the adapter, while various other ways for uniquely identifying the adapter can be used.

Note that the configuration data values shown in the SRIOV configuration data 136, 138 are examples and have been abbreviated in some cases to better fit in the drawing FIGS. 1 and 2. Also note that placement of the PF device drivers 132, 134 and SRIOV configuration data in FIGS. 1 and 2 is intended to show logical association with the respective adapter A, 104 and adapter B, 104 and should not be interpreted as conveying any information about placement of these objects in hypervisor memory.

As shown in FIGS. 1 and 2, computer system 100 includes a hardware management console (HMC1) 140, for example, to manage the system including logical partition configuration and hardware virtualization, and a flexible service processor 142.

In accordance with features of the invention, FIG. 2 shows the state of the system 100 after powering it off, removing SRIOV adapter A, 104 from slot C1, 122, inserting the SRIOV adapter A, 104 in slot C4, 128, and then powering on the system 100. The slot identifier in the configuration data associated with adapter A, 104 has been changed to that of slot C4 in FIG. 2.

As shown in FIGS. 1 and 2, the adapter A, 104 has been moved from slot C1, 122 in FIG. 1 to slot C4, 128 in FIG. 2. In FIG. 2 the hypervisor 130 includes the same SRIOV configuration data 138 for the adapter B, 104 and updated SRIOV configuration data 202 for adapter A, 104 with the slot ID 20100123 for slot C4, 128.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 3A:
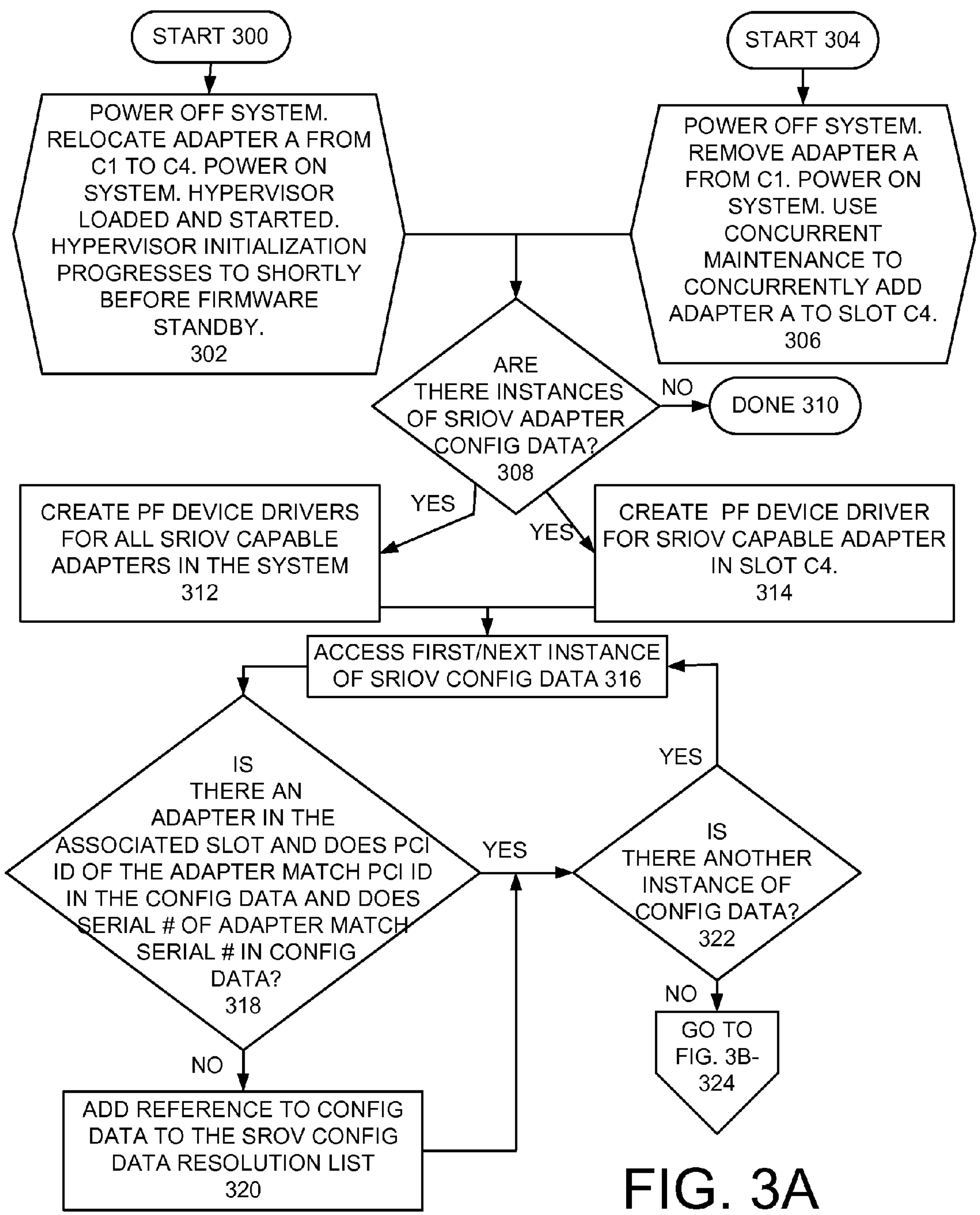

Referring to FIGS. 3A, 3B, 3C, 3D, and 3E, there are shown exemplary operations of the processing and logic that occur in the hypervisor 130 for configuration preserving relocation of the SRIOV adapter in accordance with the preferred embodiment starting at block 300 in FIG. 3A. As indicated in a block 302, after system power off, adapter A is relocated from slot C1 to slot C4, then after power on of the system, the hypervisor is loaded and started, and the hypervisor initialization progresses to shortly before firmware standby. Otherwise starting begins as indicated in a block 304, then after system power off, adapter A is removed from slot C1 then after power on of the system, concurrent maintenance is used to concurrently add adapter A to slot C4 as indicated in a block 306. Checking is performed to identify instances of SRIOV configuration data that does not match the adapters in their associated slots.

As indicated in a decision block 308, checking is performed to identify if there are instances of SRIOV adapter configuration data. When there are no instances of SRIOV adapter configuration data, then the operations are done as indicated in a block 310. Otherwise when there are instances of SRIOV adapter configuration data, then PF device drivers for all SRIOV capable adapters in the system are created as indicated in a block 312 when the process is initiated via block 302, or the PF device driver for the SRIOV capable adapter in slot C4 is created as indicated in a block 314 when the process is initiated via block 306. The first or next instance of SRIOV configuration data is accessed as indicated in a block 316.

As indicated in a decision block 318, checking is performed to identify if there is an adapter in associated slot and if the PCI ID of the adapter matches the PCI ID in the configuration data, and if the serial number of the adapter match the serial number of the configuration data. When matching is not identified, then a reference is added to configuration data to the SRIOV configuration data resolution list as indicated in a block 320. Otherwise, when matching is identified, then checking is performed to identify if there are more instances of SRIOV adapter configuration data as indicated in a decision block 322. When there is a further instance of SRIOV adapter configuration data, then the operations return to block 316 and continue. When there are no further instances of SRIOV adapter configuration data, then the operations continue in FIG. 3B at block 324.

Referring to FIG. 3B, checking is performed to determine if the SRIOV configuration resolution list is empty as indicated in a decision block 324. If the SRIOV configuration resolution list is empty, then the operations are done as indicated in a block 326. Otherwise when the SRIOV configuration resolution list is not empty, checking is performed to identify if there is at least one active PF device driver for an SRIOV adapter or, stated another way, if there are SRIOV adapters in the system as indicated in a decision block 328. When there is no active PF device driver for an SRIOV adapter, then the operations continue in FIG. 3D at block 350. When there is at least one active PF device driver for an SRIOV adapter, then the first or next element on the SRIOV configuration resolution list is accessed as indicated in a block as indicated in a block 330 in FIG. 3B.

As indicated in a block 332 in FIG. 3B, a PF device driver for the first or next SRIOV adapter is accessed. Next an adapter serial number is accessed via the PF device driver as indicated in a block 334. Next an adapter PCI ID is accessed as indicated in a block 336, then the operations continue in FIG. 3C at block 338.

Figure 3C:
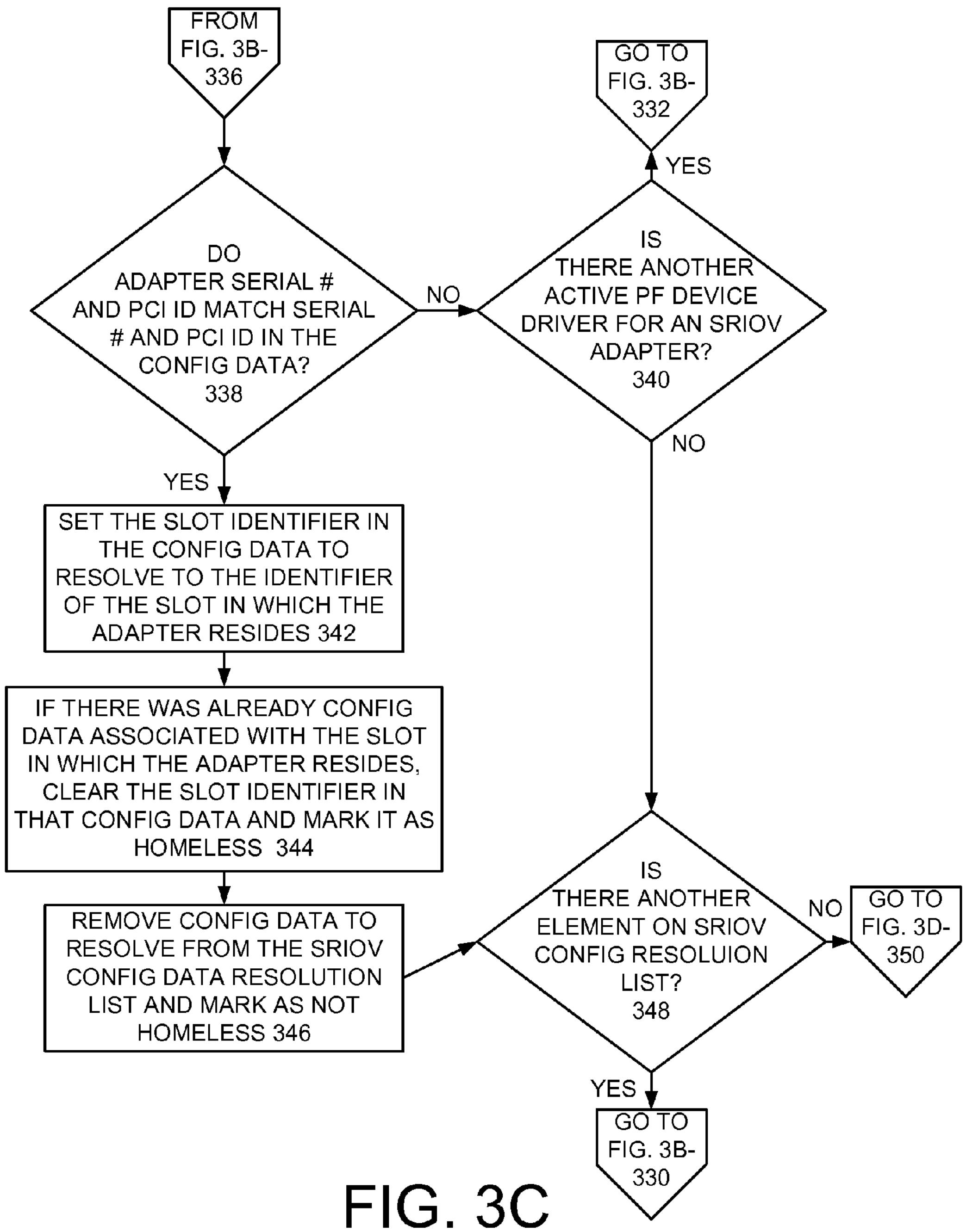

Referring to FIG. 3C, checking is performed to determine if the adapter serial number and PCI ID match the serial number and PCI ID in the SRIOV adapter configuration data as indicated in a decision block 338. If not checking is performed to determine if there is another PF device driver for an SRIOV adapter as indicated in a decision block 340. If there is another PF device driver for an SRIOV adapter then the operations return to FIG. 3B at block 332. If the adapter serial number and PCI ID match the serial number and PCI ID in the SRIOV adapter configuration data, then the slot identifier is set in the SRIOV adapter configuration data to the identifier of the slot in which the adapter resides as indicated in a block 342. If there was already configuration data associated with the slot in which the adapter resides, the slot identifier is cleared in that (the previous) configuration data as indicated in a block 344. Configuration data is removed from the SRIOV configuration data resolution list and marked as not homeless as indicated in a block 346. Checking is performed to determine if there is another element on the SRIOV configuration resolution list as indicated in a block 348. If there is another element on the SRIOV configuration resolution list, then the operations continue in FIG. 3B at block 330. If there is not another element on the SRIOV configuration resolution list, then the operations continue in FIG. 3D at block 350.

Figure 3D:
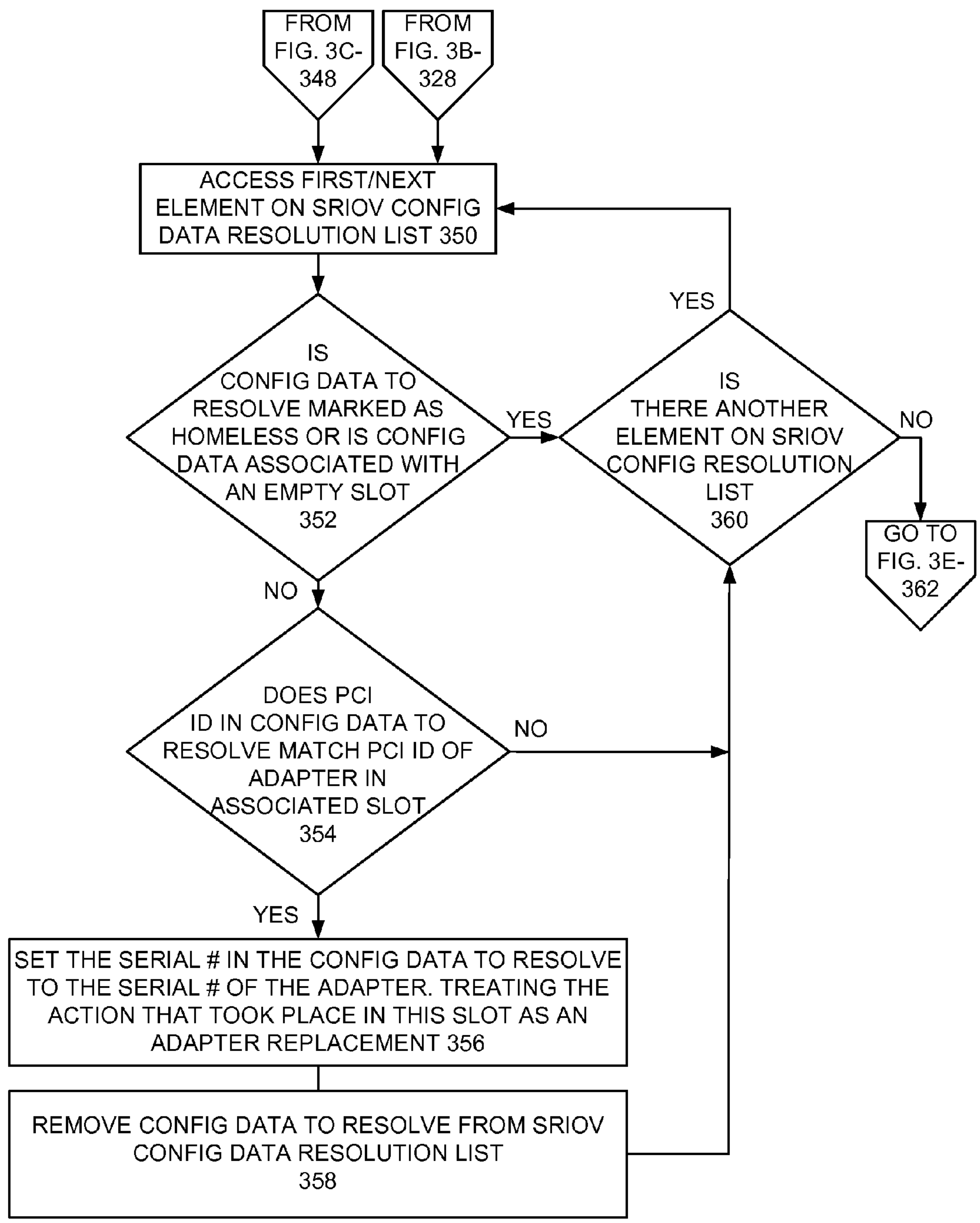

Referring to FIG. 3D, as indicated in a block 350 a first or next element is accessed on the SRIOV configuration data resolution list. Checking is performed to determine if the configuration data to resolve is marked as homeless or if the configuration data is associated with an empty slot as indicated in a decision block 352. If the configuration data to resolve is not marked as homeless or if the configuration data is not associated with an empty slot, then checking is performed to determine if the PCI ID in the configuration data to resolve matches the PCI ID of the adapter in the associated slot as indicated in a decision block 354. If the PCI ID in the configuration data to resolve matches the PCI ID of the adapter in the associated slot, then the serial number in the configuration data is set equal to the serial number of the adapter, treating the action that took place in this slot as an adapter replacement as indicated in a block 356. Then the configuration data is removed from the SRIOV configuration resolution list as indicated in a block 358. Then checking is performed to determine if there is another element on the SRIOV configuration resolution list as indicated in a block 360. If there is another element on the SRIOV configuration resolution list, then the operations return to block 350 and continue. If there is not another element on the SRIOV configuration resolution list, then the operations continue in FIG. 3E at block 362.

Figure 3E:
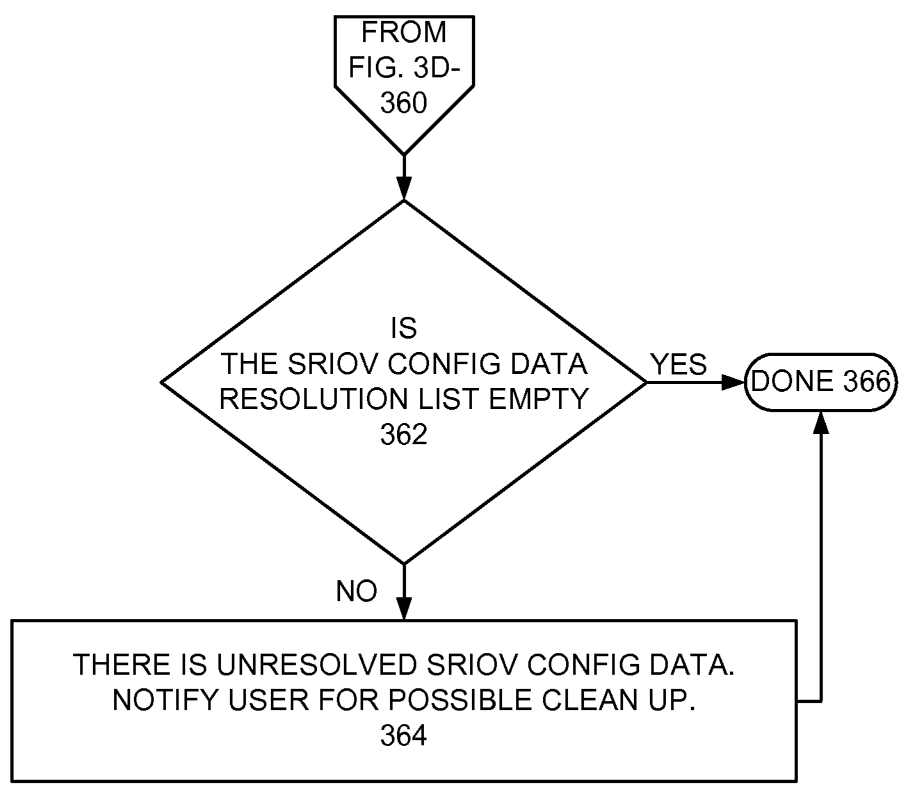

In FIG. 3E, as indicated in a decision block 362, checking is performed to determine if the SRIOV configuration data resolution list is empty. If the SRIOV configuration data resolution list is not empty, then there is unresolved SRIOV configuration data, and the user is notified for possible clean up as indicated in a block 364. If the SRIOV configuration data resolution list is empty, then the operations are done as indicated in a block 366.

Figure 4:
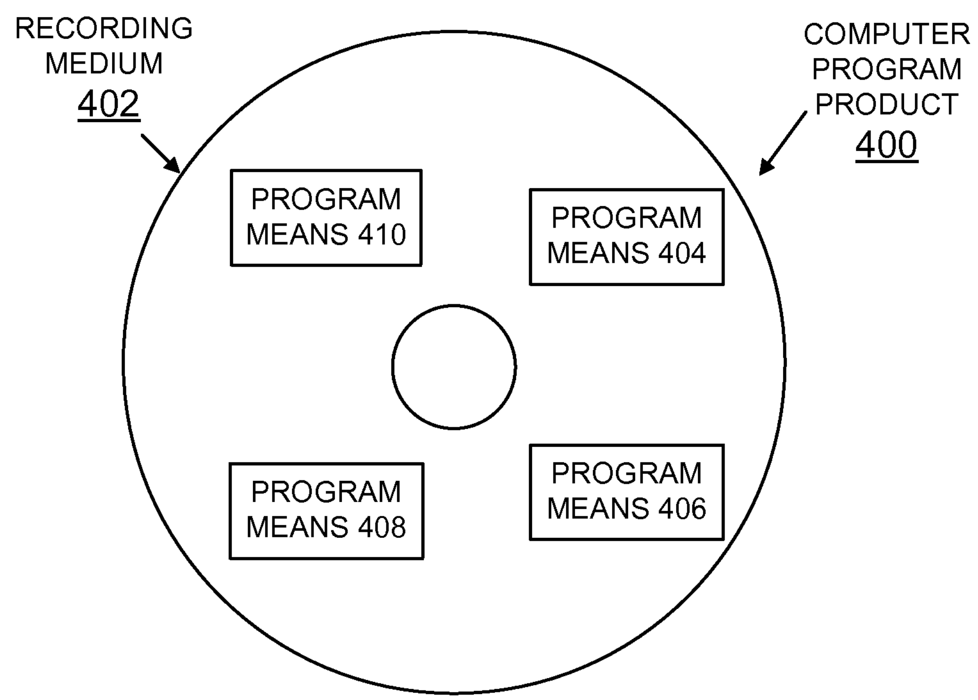
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. Recording medium 402 stores program means 404, 406, 408, and 410 on the medium 402 for carrying out the methods for implementing configuration preserving relocation of a Single Root Input/Output Virtualization (SRIOV) adapter of the preferred embodiment in the system 100 of FIG. 1.

A sequence of program instructions or a logical assembly of one or more interrelated modules defined by the recorded program means 404, 406, 408, and 410, direct the computer system 400 for implementing configuration preserving relocation of a Single Root Input/Output Virtualization (SRIOV) adapter of the preferred embodiment.

While the present invention has been described with reference to the details of the embodiments of the invention shown in the drawing, these details are not intended to limit the scope of the invention as claimed in the appended claims.

What is claimed is:

1. A method for implementing configuration preserving relocation of a Single Root Input/Output Virtualization (SRIOV) adapter in a computer system comprising:

checking at power on and automatically detecting at system power on an SRIOV adapter having been relocated to a different slot while the system was powered off using an identifier of the SRIOV adapter and an identifier of the slot stored in SRIOV configuration data, adding reference to an SRIOV configuration data resolution list responsive to the detected relocated adapter;

automatically updating configuration data associated with the SRIOV adapter with the identifier of the different slot for remaining associated with the relocated adapter to the different slot using said SRIOV configuration data resolution list without user intervention by addressing an element on said SRIOV configuration data resolution list and accessing a PF device driver for a first SRIOV adapter and accessing said identifier of the SRIOV adapter and said identifier of the slot stored in SRIOV configuration data;

addressing and processing each element on said SRIOV configuration data resolution list;

notifying a user of any unresolved SRIOV configuration data from said SRIOV configuration data resolution list;

storing the identifier of the SRIOV adapter and the identifier of the different slot with the SRIOV configuration data associated with the SRIOV adapter in persistent data:

identifying existing stored SRIOV configuration data associated with the identifier of the different slot, clearing the slot identifier in the identified existing stored SRIOV configuration data and marking the existing stored SRIOV configuration data as homeless, and adding reference to said SRIOV configuration data resolution list responsive to the identified existing stored SRIOV configuration data; and addressing and processing each element on said SRIOV configuration data resolution list to continue automatically updating configuration data.

2. The method as recited in claim 1 wherein automatically updating configuration data associated with the SRIOV adapter for remaining associated with the relocated adapter using an SRIOV configuration data resolution list without user intervention includes accessing SRIOV configuration data, and identifying an adapter in a slot not matching an adapter in the SRIOV configuration data, adding reference to the SRIOV configuration data to the SRIOV configuration data resolution list, and processing the SRIOV configuration data resolution list.

3. The method as recited in claim 1 wherein the configuration data includes an identifier of the slot in which the associated SRIOV adapter resides.

4. The method as recited in claim 3 wherein the configuration data includes a serial number of the associated SRIOV adapter in the slot.

5. The method as recited in claim 3 wherein the configuration data includes a peripheral component interface (PCI) ID of the associated SRIOV adapter in the slot.

6. The method as recited in claim 1 wherein a system hypervisor at system power on automatically detects when an SRIOV adapter was relocated to a different slot.

7. The method as recited in claim 6 includes said system hypervisor identifying SRIOV configuration data where the data is associated with a slot in which there is no adapter.

8. The method as recited in claim 1 includes said system hypervisor identifying SRIOV configuration data where a unique adapter identifier stored in the configuration data does not match the unique adapter identifier of the adapter in the slot with which the configuration data is associated.

9. The method as recited in claim 8 includes said system hypervisor identifying the adapter with unique adapter identifier that matches the unique adapter identifier in the SRIOV configuration data and updating the SRIOV configuration data with the identifier of the slot in which the adapter resides.

10. The method as recited in claim 1 includes reading the SRIOV configuration data from persistent data and storing the SRIOV configuration data in main memory with an initial program load (IPL) of a system hypervisor.

11. A system for implementing configuration preserving relocation of a Single Root Input/Output Virtualization (SRIOV) adapter in a computer system comprising:

a processor;

a hypervisor managing functions associated with the SRIOV adapter;

said processor using said hypervisor to perform the steps of:

checking at power on and automatically detecting at system power on an SRIOV adapter having been relocated to a different slot while the system was powered off using an identifier of the SRIOV adapter and an identifier of the slot stored in SRIOV configuration data, adding reference to an SRIOV configuration data resolution list responsive to the detected relocated adapter;

automatically updating configuration data associated with the SRIOV adapter with the identifier of the different slot for remaining associated with the relocated adapter to the different slot using said SRIOV configuration data resolution list without user intervention by addressing an element on said SRIOV configuration data resolution list and accessing a PF device driver for a first SRIOV adapter and accessing said identifier of the SRIOV adapter and said identifier of the slot stored in SRIOV configuration data;

addressing and processing each element on said SRIOV configuration data resolution list;

notifying a user of any unresolved SRIOV configuration data from said SRIOV configuration data resolution list;

storing the identifier of the SRIOV adapter and the identifier of the different slot with the SRIOV configuration data associated with the SRIOV adapter in persistent data;

identifying existing stored SRIOV configuration data associated with the identifier of the different slot, clearing the slot identifier in the identified existing stored SRIOV configuration data and marking the existing stored SRIOV configuration data as homeless, and adding reference to said SRIOV configuration data resolution list responsive to the identified existing stored SRIOV configuration data; and addressing and processing each element on said SRIOV configuration data resolution list to continue automatically updating configuration data.

12. The system as recited in claim 11 wherein automatically updating configuration data associated with the SRIOV adapter for remaining associated with the relocated adapter using an SRIOV configuration data resolution list without user intervention includes accessing SRIOV configuration data, and identifying an adapter in a slot not matching an adapter in the SRIOV configuration data, adding reference to the SRIOV configuration data to the SRIOV configuration data resolution list, and processing the SRIOV configuration data resolution list.

13. The system as recited in claim 11 wherein said configuration data includes an identifier of the slot in which the associated SRIOV adapter resides.

14. The system as recited in claim 11 wherein said configuration data includes a serial number of the associated SRIOV adapter in the slot.

15. The system as recited in claim 11 wherein said configuration data includes a peripheral component interface (PCI) ID of the associated SRIOV adapter in the slot.

16. The system as recited in claim 11 includes said system hypervisor identifying SRIOV configuration data where the data is associated with a slot in which there is no adapter.

17. The system as recited in claim 11 includes said system hypervisor identifying SRIOV configuration data where a unique adapter identifier stored in the configuration data does not match the unique adapter identifier of the adapter in the slot with which the configuration data is associated.

18. The system as recited in claim 17 includes said system hypervisor identifying the adapter with unique adapter identifier that matches the unique adapter identifier in the SRIOV configuration data and updating the SRIOV configuration data with the identifier of the slot in which the adapter resides.

19. The system as recited in claim 11 includes said system hypervisor storing the SRIOV configuration data in persistent data and storing the SRIOV configuration data in main memory with an initial program load (IPL) of a system hypervisor.

* * * * *